March 18, 1969     E. W. SPRINGER     3,432,927
TURN COMPUTER
Original Filed Aug. 10, 1964
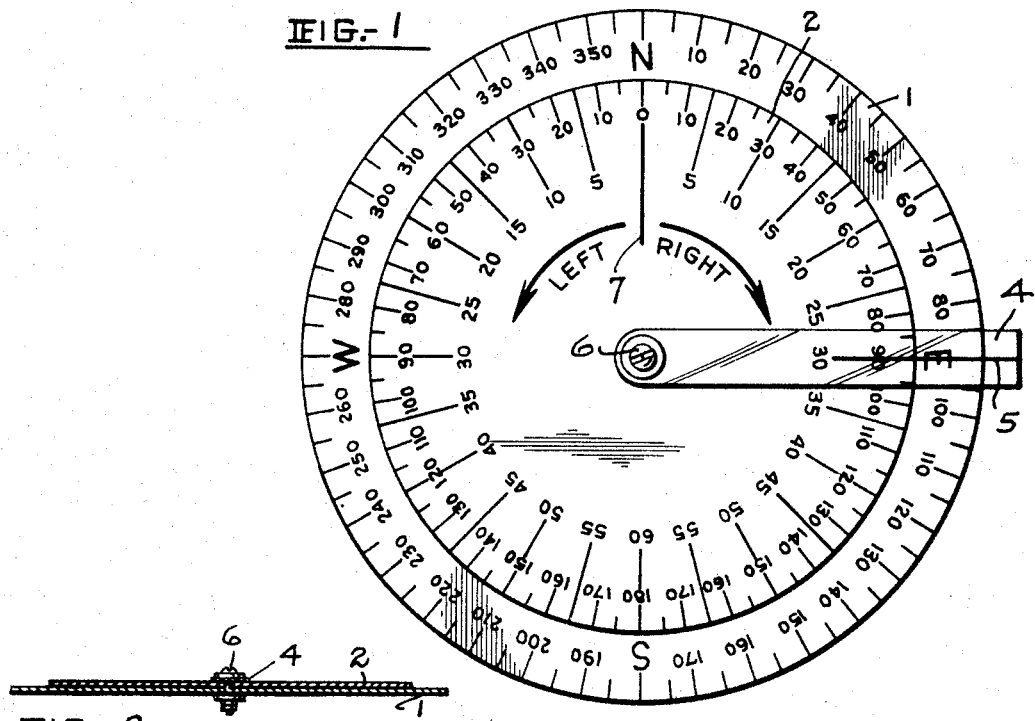
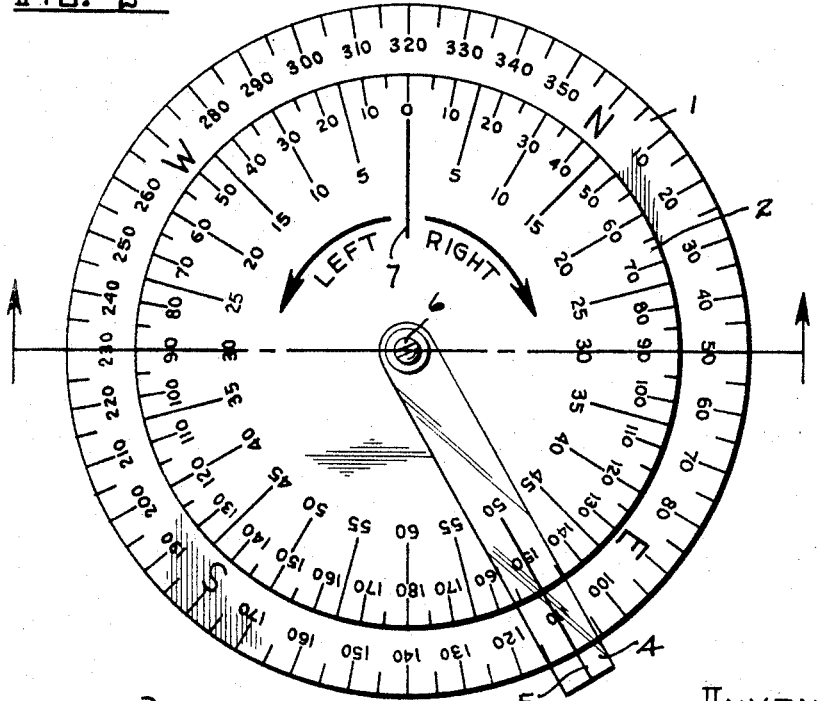
INVENTOR
EARL W. SPRINGER
BY Herbert A. Winturn
ATTORNEY

United States Patent Office

3,432,927
Patented Mar. 18, 1969

3,432,927
TURN COMPUTER
Earl W. Springer, 6711 Shelley St.,
Indianapolis, Ind. 46219
Continuation of application Ser. No. 388,404, Aug. 10, 1964. This application Aug. 21, 1967, Ser. No. 662,185
U.S. Cl. 33—1  2 Claims
Int. Cl. G01c 21/20

ABSTRACT OF THE DISCLOSURE

A turn indicator with a minor diameter disc pivotally mounted on a major diameter disc wherein a 360 degree scale is exposed in full around the periphery of the major disc; a circular scale extends around the periphery of the minor disc and is divided into 180 degrees extending from a common zero in right and left manner, with the right 180 degrees matching with the first 180 degrees of the 360 degree scale; and a time scale in circular arrangement within the circular 180 degree scale, the time scale running 60 seconds in opposite directions from a common zero.

---

This application is a continuation of application Ser. No. 388,404, filed Aug. 10, 1964, now abandoned.

This invention relates to means for computing elapsed time required to complete a turn in navigation of airplanes. The device constituting the invention is provided to insure accuracy in the making of and completion of turns either to the right or to the left in reference to a due north indication so that the pilot of the airplane may know exacly when the time taken for the necessary angle of turn has been completed.

Of course there are no landmarks in the sky when flying entirely by instruments and in the absence of any help, the pilot must use considerable mental effort to make the proper solution of the angle and the time required in his flight when the turns are required to be made.

One of the primary instruments used at present in instrument flying is the instrument called the Turn and Bank Indicator. Marks are placed on the face of the instrument such that when needle is centered the airplane is not turning and when the needle has for example, deflected to a mark on the left of center, it will indicate that the airplane is being turned to the left at such a rate, that if the rate is continued for two minutes, the airplane will have turned through a complete circle of three hundred and sixty degrees. A similar mark is placed on the right side of the center mark so that a right turn may be made and timed in the same manner as in the left turn. These turns, right or left, are called "standard rate" turns and are in common practice used in the primary instrument control of aircraft.

In actual practice, using this primary instrument, the only way a flying heading change can be made with any degree of accuracy is by means of timed turns. As for example, an airplane is being flown due north, and it is desired to change the direction of the flight to due east, then the due north heading, determined by a magnetic compass in the airplane, will be designated as a heading of zero degrees, and the east heading will require a right turn which will be designated as ninety degrees. To make this heading change, reference is made to the Turn and Bank Indicator and the airplane is turned to the right until the turn needle on the indicator moves to the right to the ninety degree mark right of the center mark. The airplane is held in the turn for a period of thirty seconds; this type of turn is known as a "standard rate" turn of ninety degrees.

From this example, it can be seen that changes of flight heading can be made with considerable accuracy by utilizing the combination of needle deflection and time. However, when it is desired to make a more complicated heading change, such as from three hundred and twenty degrees to one hundred and fifty degrees or any other combination that may be required, considerable mental effort is required to be exercised in order to make the proper solution of the required angle and the time required to elapse to complete the turn.

Normally, when flying on instruments, the pilot is too occupied with other checks and counter checks, etc., to make the proper mental calculation of the angle required and the time to complete that angle is turned.

In order that the invention may be better understood, reference is made to the accompanying drawing, in which FIG. 1 is a view in top plan of the device embodying the invention;

FIG. 2 is a view in section diametrically through the device, and on a greatly reduced scale; and FIG. 3 is a top plan view of the device showing it to be set for a heading different from that indicated in FIG. 1.

Referring to FIG. 1, this view shows a complete azimuth scale identified in general by the numeral 1. This disc 1 carries around its marginal portion on the top side thereof, the scale divided into three hundred and sixty degrees, and this disc is designated as the "heading scale."

A second disc 2 is mounted concentrically of the disc 1 so as to rotate on its pivot member 6 in reference to the disc 1. The disc 2 is of smaller diameter than that of disc 1, so that the degrees indicated on disc 1 are entirely visible therearound and are out beyond the periphery of the disc 2.

Disc 2 carries around its marginal portion a series of degree marks running from zero to one hundred and eighty to the right, and likewise degree marks running from zero to one hundred and eighty around to the left side of the zero mark. Further, disc 2 carries there around in circular arrangment a plurality of figures from the right side of the zero line running from five to sixty, these figures indicating seconds, and as will be noted, each five seconds is in alignment with a specific indicated degree mark around the peripheral portion of the disc 2. That is, the disc 2 gives elapsed time indications both from the left and from the right of the zero line. This zero line is herein designated by the numeral 7.

There is a transparent marker element 4 attached to and swingable around the axis member 6. The transparent member 4 carries a line 5 of proper length from its outer end to traverse the degree readings on both discs 1 and 2, FIG. 3. Preferably, the member 4 extends radially slightly outwardly beyond the periphery of the disc 1.

Assuming that the plane is flying due north, and it is desired to make a ninety degree right turn, the disc 2 is rotated about the member 6 to bring the line 7 in direct alignment with the due north mark N on the azimuth scale on disc 1. Then the marker 4 is brought around to have its line 5 alignment with the ninety degree mark on scale 2 and the E mark on the scale 1. At the inner end of the line 5 the number of seconds, thirty, appears, indicating that the plane should be held in the turn direction to the right for thirty seconds, at the end of which time, the plane would be headed due east.

That is a simple calculation, but for more involved headings FIG. 3 has been set up to indicate a new heading from a three hundred and twenty degree heading to be to the right one hundred and ten degrees. The marker 4 is set to bring the line 5 over the one hundred and ten degree marking on the disc 1 while the disc 2 has its line 7 aligned with the original heading of three hundred and twenty degrees. Then the time for making the turn is indicated by the numeral 50 appearing at the inner end of the line 5. Thus, the pilot will hold the plane in that turn for the new heading one hundred and ten degrees for a period of time of fifty seconds and then he will be properly headed on the new heading. Further, it will be noted that the angle of the new heading from the old heading can be read directly over the line 5 passes over the scale of disc 2, showing a total angle of one hundred and fifty degrees required to make that new heading, that is forty degrees between the original heading of three hundred and twenty degrees to the zero or north position on the scale 1 and then one hundred and ten degrees from north to the new heading, giving the total of one hundred and fifty degrees.

Therefore, it is to be seen that the pilot merely has to make the simple manipulations of the scale 2 and the marker 4 to known both the required angle to turn, and also the required time to make that complete turn. From this particular example, it may be observed that any desired heading change may be computed by my invention either in angle or time and also in respect to left and right sense so that all turns will subtend the smallest angle.

It is, therefore, to be seen that I have discovered a very simple device operating in a greatly simplified manner to reach the solution of a very important navigation problem. While I have herein shown and described my invention in the one particular form, it is obvious that structural changes may be made without departing from the spirit of the invention, and I, therefore, do not desire to be limited to that particular form beyond the limitations of the following claims.

I claim:
1. A navigational device for indicating a time period required to attain a new heading of an aircraft at a standard turn rate, said device comprising
   a major disc having a first single circular degree scale running at one radius clockwise in ascending numerical order from zero to 360 degrees around the top side peripheral portion of the disc;
   a minor disc of less diameter than that of the major disc centrally pivoted to the major disc fully to expose said first degree scale and having a second single circular degree scale running at one smaller radius around its top side peripheral portion clockwise in ascending numerical order from zero to 180 degrees and counterclockwise in ascending numerical order from zero to 180 degrees;
   said minor disc carrying also a single circular time scale running at one still smaller radius around its top side clockwise in ascending numerical order from zero in radial alignment with zero on said second degree scale to 60 seconds in radial alignment with 180 degrees on said second degree scale and running counterclockwise in ascending numerical order from said zero on said time scale to said 60 seconds on said time scale, said scales being concentric.
2. A device as in claim 1 further comprising
   a member centrally pivoted to be swingable over both of said discs and to extend over said first degree scale; and
   means on said member defining a line extending radially outwardly from the pivot point of said member to traverse said time scales and degree scales.

References Cited

UNITED STATES PATENTS 2,329,274  9/1943  Lamoreaux _____ 235—83
2,477,556  7/1949  Shaw.

FOREIGN PATENTS 7,270   1885   Great Britain.
24,084  1906   Great Britain.

WILLIAM D. MARTIN, JR., *Primary Examiner.*

U.S. Cl. X.R.

235—83